United States Patent
Krichman et al.

(10) Patent No.: US 8,560,530 B2
(45) Date of Patent: Oct. 15, 2013

(54) METHODS, APPARATUS, AND ARTICLES OF MANUFACTURE TO RANK WEB SITE INFLUENCE

(75) Inventors: Yakir Krichman, Givat Hen (IL); Eliyahu Greitzer, Herzliya (IL)

(73) Assignee: BuzzMetrics, Ltd., Herzliya (IL)

( * ) Notice: Subject to any disclaimer, the term of this patent is extended or adjusted under 35 U.S.C. 154(b) by 408 days.

(21) Appl. No.: 12/816,159

(22) Filed: Jun. 15, 2010

(65) Prior Publication Data

US 2011/0282880 A1 Nov. 17, 2011

Related U.S. Application Data

(60) Provisional application No. 61/345,472, filed on May 17, 2010.

(51) Int. Cl.
 *G06F 17/00* (2006.01)
(52) U.S. Cl.
 USPC .......... 707/723; 707/608; 707/687; 707/790; 707/821; 707/600
(58) Field of Classification Search
 USPC ..................... 707/600, 608, 687, 723, 790
 See application file for complete search history.

(56) References Cited

U.S. PATENT DOCUMENTS

| | | | |
|---|---|---|---|
| 7,421,429 B2 | 9/2008 | Thota | |
| 7,533,084 B2 | 5/2009 | Holloway et al. | |
| 7,779,001 B2 | 8/2010 | Zeng et al. | |
| 7,844,484 B2 * | 11/2010 | Arnett et al. | 705/7.31 |
| 8,200,775 B2 * | 6/2012 | Moore | 709/217 |
| 2005/0256905 A1 * | 11/2005 | Gruhl et al. | 707/104.1 |
| 2006/0069663 A1 * | 3/2006 | Adar et al. | 707/1 |
| 2007/0038646 A1 | 2/2007 | Thota | |
| 2007/0061297 A1 | 3/2007 | Bihun et al. | |
| 2007/0198510 A1 | 8/2007 | Ebanks | |
| 2008/0059348 A1 | 3/2008 | Glassman et al. | |
| 2008/0147487 A1 | 6/2008 | Hirshberg | |
| 2008/0249798 A1 | 10/2008 | Tulshibagwale | |
| 2009/0006341 A1 | 1/2009 | Chapman | |
| 2009/0138356 A1 * | 5/2009 | Pomplun | 705/14 |

(Continued)

FOREIGN PATENT DOCUMENTS

| JP | 2007334590 | 12/2007 |
|---|---|---|
| JP | 2009211429 | 9/2009 |

OTHER PUBLICATIONS

IP Australia, "Notice of Acceptance", issued in connection with AU patent application No. 2011202277, mailed Feb. 22, 2013 (3 pages).

(Continued)

*Primary Examiner* — Sana Al Hashemi
(74) *Attorney, Agent, or Firm* — Hanley, Flight, & Zimmerman, LLC

(57) ABSTRACT

Methods, apparatus, and articles of manufacture to rank a web site are disclosed herein. An example method to rank the influence of a web site involves receiving a topic term, filtering out a post that is not relevant to the topic term from a first plurality of posts to a web site, determining a number of inbound links to the web site based on the topic term, determining a time between the inbound links to the web site based on the topic term, and generating a rank of the web site based on the number of inbound links and the time between the inbound links.

13 Claims, 10 Drawing Sheets

(56) References Cited

U.S. PATENT DOCUMENTS

2009/0164408 A1 6/2009 Grigorik et al.
2009/0305006 A1* 12/2009 Steffen .................. 428/195.1
2010/0042473 A1 2/2010 Arora et al.

OTHER PUBLICATIONS

SIPO, "Second Office Action" and translation issued in connection with CN patent application No. 201110180894.3, mailed Apr. 15, 2013, (12 pages).

Zhang Dongrong et al., "Sustainable Developing Mechanism of the NSTL Renewable Energy Subject Portal", National Science Library of CAS, Feb. 2009 (6 pages).

Ryan Paul, "First look at Buzz: much potential, not much innovation yet," updated Feb. 11, 2010, 4 pages.

Japanese Patent Office, "Notice of Reasons for Rejection," issued in connection with Japanese Patent Application No. 2011-110626, Jul. 17, 2012 (3 pages).

German Patent and Trademark Office, "Office Action", issued in connection with German Patent Application No. 102011101791.0, Sep. 12, 2012, (8 pages).

Glance et al., "BlogPulse: Automated Trend Discovery for Weblogs", WWW 2004 Workshop on the Weblogging Ecosystem: Aggregation, Analysis and Dynamics, May 17-22, 2004, (8 pages).

Kritikopoulos et al., "Blogrank: Ranking Weblogs Based on Connectivity and Similarity Features", AAA-IDEA '06 Preceedings of the 2nd International Workshop[ on Advanced Architectures and Algorithms for Internet Delivery and Applications, Oct. 10, 2006, (8 pages).

Chinese Patent Office, "First Office Action", issued in connection with Chinese Patent Application No. 2011101808943, Aug. 29, 2012, (6 pages).

Miyata et al., "Blog Search Method Based on Analysis of Response to a Blog Entry", Information Processing Society of Japan, Vold. 48, No. 12, Dec. 2007, with partial translation (16 pages).

Australian Government, "Patent Examination Report No. 1", issued in connection with Australian patent application No. 2011202277, Jul. 11, 2012, (4 pages).

Tayebi et al., "B2Rank: An Algorithm for Ranking Blogs Based on Behavioral Features", 2007 IEEE/WIC/ACM International Conference on Web Intelligence, (4 pages).

\* cited by examiner

METHODS, APPARATUS, AND ARTICLES OF MANUFACTURE TO RANK WEB SITE INFLUENCE

RELATED APPLICATIONS

This application claims priority from U.S. Provisional Application No. 61/345,472, filed May 17, 2010, the entirety of which is incorporated herein by reference.

FIELD OF THE DISCLOSURE

This disclosure relates generally to web site monitoring and, more particularly, to systems, methods, apparatus, and articles of manufacture to rank web site influence.

BACKGROUND

Weblogs, or blogs, refer to online postings maintained by one or more persons who publish content for other online users to view. Weblogs may be maintained by individuals to express their views and opinions about various situations, by organizations to provide a direct connection to their audiences, or by any other person or group for almost any purpose. Weblogs have become a popular medium because of their very low barriers to entry and wide reach. Weblogs have very few, if any, requirements for postings, and weblogs are highly varied in content and style. Many weblogs are focused on a narrow range of subjects, while many other weblogs are directed to a broad range of topics. Also, many weblogs are updated often, while many other weblogs are updated scarcely.

DETAILED DESCRIPTION

Figure 1:
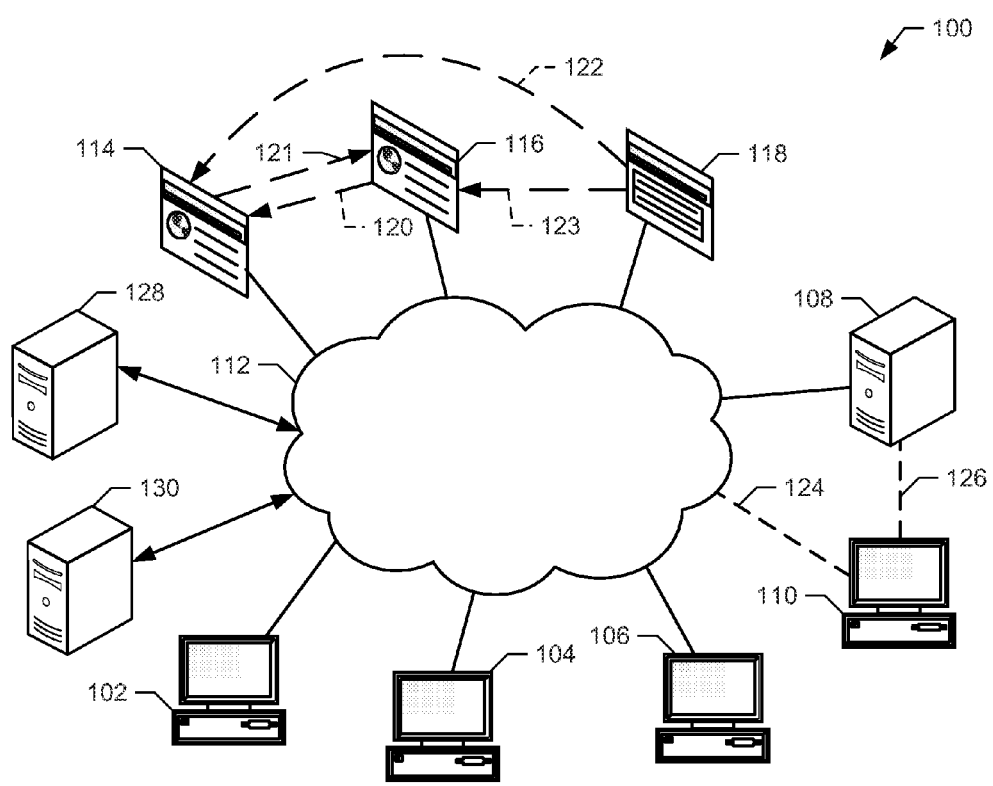
FIG. 1 is an example system and network to rank the influence of a weblog.

Although the example systems described herein include, among other components, software executed on hardware, such description is merely illustrative and should not be considered as limiting. For example, it is contemplated that any or all of the disclosed hardware and/or software components could be embodied exclusively in dedicated hardware, exclusively in software, exclusively in firmware or in some combination of hardware, firmware, and/or software.

The example methods, apparatus, and articles of manufacture described herein may be used to measure and/or rank influence of web sites on the Internet, such as weblogs (i.e., "blogs"), based on a particular topic of interest. Some example methods described herein to rank influence of a weblog include determining or measuring four metrics or ranking factors of a weblog, which include topic volume, popularity, topic authority, and topic virality.

In some described examples, topic volume refers to a number of posts (e.g., comments, articles, opinions, submissions) to a weblog that are related to a defined topic. Popularity refers to the number of hits or user accesses (e.g., unique, not unique) to the weblog and may be restricted to a particular time frame. Topic authority refers to a number of inlinks (also known as inbound links and/or backlinks) to the weblog from other web sites (e.g., a number of other web sites and/or weblogs that provide direct or indirect web links which, when activated by a user, load the weblog). Topic virality refers to a median time between inlinks to the weblog from other web sites. Topic authority and topic virality may be based on posts in weblogs and web forums that are relevant to the specified topic.

Some example systems are described as monitoring and ranking topic specific weblogs. In some examples, one or more computer processing systems monitor Internet weblogs, forums, and/or other web sites to record the dates, times, and/or contents of posts. As used herein, the term "post" refers to any statement, question, opinion, article, report, commentary, and/or any other type of submission, typewritten or otherwise, by a web user of a weblog, forum, and/or other web site where the submission is displayed for others to view and/or respond. The monitoring computer processing systems may generate one or more indices of the time, date, and/or contents of posts for later aggregation and/or processing. Additionally, the term "rank" as used herein will refer to a number rank, where a lower number corresponds to a higher or better rank. However, a weblog "rank" may also be directly proportional to a weighted score of the weblog according to one or more ranking factors, where a higher rank corresponds to a higher score.

Example systems may include one or more computer processing systems to measure and/or rank a weblog with respect to a desired topic, based on monitored posts. In some examples, a computer processing system receives a topic and aggregates posts collected by monitoring systems that are relevant to the received topic. The example computer processing systems then determine several ranking factors, including a topic volume of a weblog, a popularity of the weblog, a topic authority of the weblog, and a topic virality of the weblog. In some examples, each of the topic volume, the popularity, the topic authority, and the topic virality are normalized, scored, and/or weighted so that each of the ranking factors has a negative (or positive) relationship to the ranking.

Some example methods to rank the influence of a weblog include receiving a topic term, filtering out a post that is not relevant to the topic term from a first plurality of posts to the weblog, determining a number of inbound links to the weblog based on the topic term, determining a time between the inbound links to the weblog based on the topic term, and generating a rank of the weblog based on the number of inbound links and the time between the inbound links.

Some example apparatus to rank the influence of a weblog are also described, including an authority determiner to determine a number of inbound links to the weblog that are associated with a predetermined topic, a virality determiner to determine a time difference between consecutive links to the weblog from one or more web sites that are associated with the predetermined topic, and a weblog ranker, coupled to the authority determiner and the virality determiner, the weblog ranker to determine a rank of the weblog based on the number of posts, the popularity, the number of links, and the time difference.

Some additional example methods to rank the influence of a weblog are also described, including determining a popularity of the weblog, receiving a topic term, determining a number of posts to the weblog, determining a topic volume based on the topic term and the number of posts to the weblog, determining a topic authority of the weblog based on the topic term and the number of posts to the weblog, determining a topic virality of the weblog based on the topic authority, and determining a rank of the weblog based on the topic authority, the topic virality, the popularity, and the topic volume.

Some examples are described herein that refer to ranking the influence of a weblog. Although the examples use the term "weblog," the examples are equally applicable to other types of web sites. Accordingly, while some examples described herein refer to ranking the influence of a weblog, the examples are not limited to ranking weblogs. In fact, the example methods, apparatus, and articles of manufacture described herein may be used to rank the influence of any type of weblog, forum, and/or other web site for which factors relevant to an influence rank and/or a topic may be determined.

Weblogs are web sites maintained by bloggers who add and/or update content to the weblogs for consumption by viewers. Weblogs may be maintained by individuals and/or organizations, and many weblogs are directed to a general or particular topic. Forums are also often focused on a particular topic, but differ from weblogs generally by consisting of posts or messages from any user of the forum instead of consisting of posts from selected bloggers as in a weblog. For example, some forums are directed toward question and answer and/or problem and solution formats. However, many different forums are directed to other topics and/or formats.

Some examples described below refer to indices for storing data. As used herein, the term "index" refers to a data structure used to store data, where different indices may be used to store different types of data and the data in different indices may be compared and/or otherwise manipulated. While some example data structures are illustrated below, other data structures may alternatively be used to implement the indices.

FIG. 1 is an example system 100 to rank the influence of a weblog. The example system 100 of FIG. 1 includes one or more weblog monitoring systems 102, 104, and 106, a weblog ranking system 108, and a user terminal 110. The monitoring systems 102-106, the weblog ranking system 108, and the user terminal 110 are interconnected via a wide area network such as the Internet 112.

Weblogs 114 and 116 and web sites 118 are accessible by the weblog monitoring systems 102-106 via the Internet 112 (e.g., the World Wide Web). The weblogs 114 and 116 and the web site 118 may be loaded by directing a web browser (e.g., Microsoft® Internet Explorer®, Mozilla® Firefox®, etc.) to a server that hosts the weblog 114 or 116 and/or the web site 118 using a Uniform Resource Locator (URL).

Additionally, the weblogs 114 and 116 and/or web sites 118 provide links to other weblogs and/or forums. For example, the content of the weblog 116 includes a link 120 which, when selected by a user of the weblog 116, loads the weblog 114 into the user's web browser. From the perspective of the weblog 114, the link 120 is considered an inlink. Similarly, the weblog 114 includes a link 121 to the weblog 116 and the web site 118 includes links 122 and 123 to load the weblogs 114 and 116, respectively.

While the example user terminal 110 is illustrated in FIG. 1 as connected to the weblog ranking system 108 via an Internet connection 124, the user terminal 110 may be additionally or alternatively connected to the weblog ranking system 108 via a direct or local connection 126 (e.g., a local area network connection, a client-server connection). A user (not shown) of the system 100 may use the user terminal 110 to request from the weblog ranking system 108 weblog ranking(s) of weblogs 114 and 116 and/or portions of the weblogs 114 and 116 that are pertinent to a topic that is entered by the user. For example, the user may enter a particular topic, for example, in keyword and/or query format.

The example system 100 may further include a popularity monitoring system 128 and/or a search monitoring system 130. The popularity monitoring system 128 determines a popularity of the example weblogs 114 and 116 by determining, for example, the number of unique visitors to each of the weblogs 114 and 116. The search monitoring system 130 monitors behaviors of search users. For example, the search monitoring system 130 may monitor topic(s) searched by users and the weblogs 114 and 116 and/or web sites 118 that are then accessed by users as a result of searching the topic and receiving the search results. In some examples, the search monitoring system 130 further monitors the order in which the users access the weblogs 114 and 116 and/or web sites 118 to determine a likelihood that a user will access a particular weblog 114 and 116 or web site 118 after searching a topic.

Figure 2:
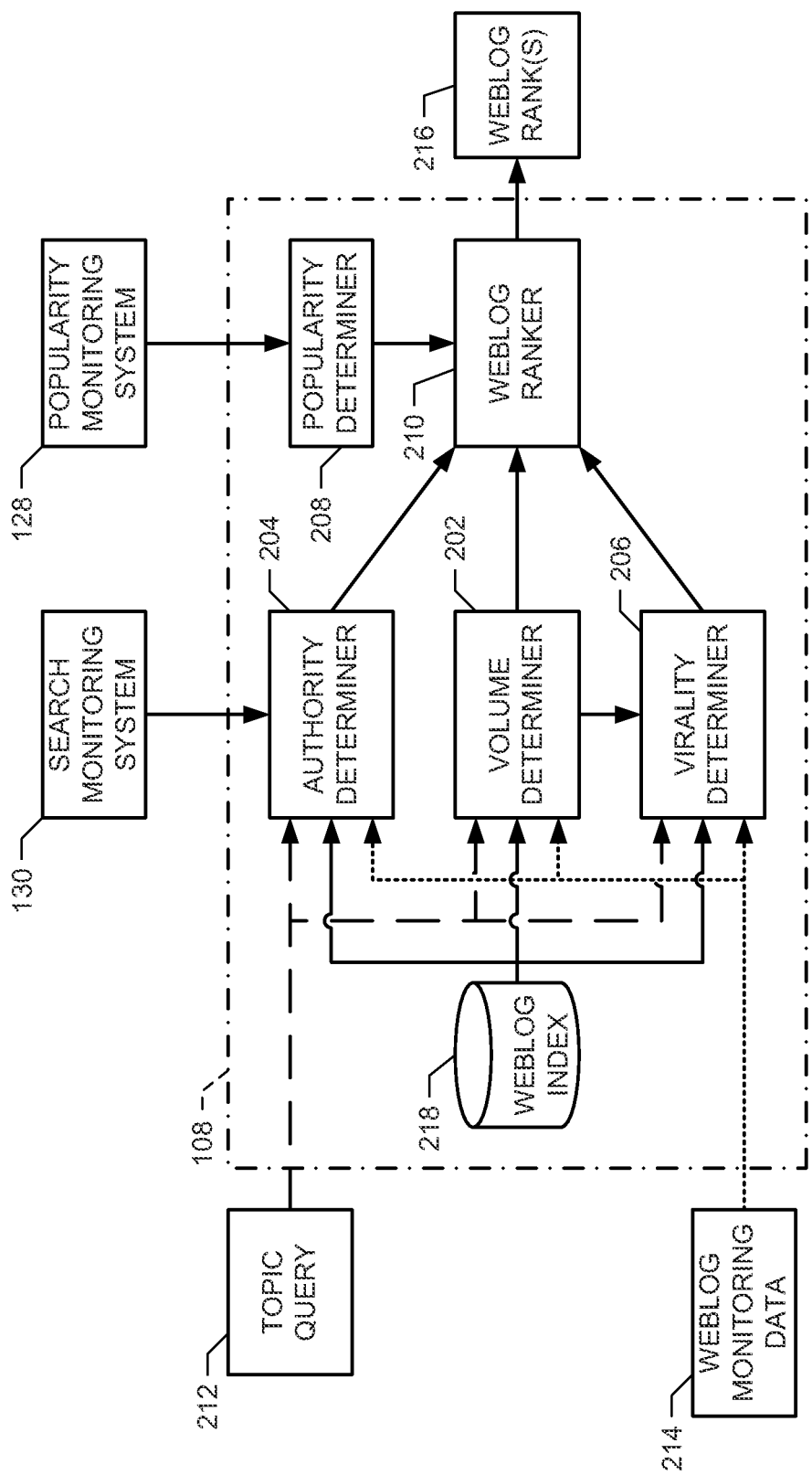
FIG. 2 is a more detailed block diagram of the example system to rank the influence of a weblog shown in FIG. 1.

FIG. 2 is a block diagram illustrating an example implementation of the weblog ranking system 108 which may be used to rank the influence of a weblog (e.g., the weblog 114 of FIG. 1). The example weblog ranking system 108 includes a volume determiner 202, a virality determiner 206, an authority determiner 204, a popularity determiner 208, and a weblog ranker 210. The weblog ranking system 108 receives a topic query 212 that defines a topic of interest and monitoring data 214, and outputs a weblog rank 216 based on the topic query 212 and the monitoring data 214.

The example weblog ranking system 108 further includes a weblog index 218. The weblog index 218 includes a list of the weblogs 114 and 116 that are monitored by the weblog monitoring systems 102-106 and identifications (IDs) of posts to the weblogs 114. The weblog index 218 may further include an indication of which ones of the weblog monitoring systems 102-106 monitor respective ones of the weblogs 114 and 116. Example contents of the weblog index 218 are illustrated in Table 1.

TABLE 1

| WEBLOG ID | POST ID | WEBLOG URL |
|---|---|---|
| . . . | | . . . |
| [114] | [1140001], [1140002], [1140003] | www.weblog114.com |
| [116] | [1160001], [1160002] | www.weblog116.com |
| . . . | | . . . |

The example volume determiner 202 receives the topic query 212 (e.g., from the user terminal 110 of FIG. 1), the monitoring data 214 (e.g., from the monitoring systems 102-106 of FIG. 1), and a list of the weblogs 114 and 116 (e.g., from the weblog index 218). Based on the topic query 212 and the monitoring data 214, the volume determiner 202 determines a volume of posts that are posted to the weblog 114. The example volume determiner 202 includes posts that are relevant to the topic query 212 and excludes posts that are not relevant to the topic query 212. Relevance may be determined using any method, such as including only posts that have all of the words and/or phrases in the topic query 212 and/or including posts that have any of the words and/or phrases in the topic query 212. The volume determiner 202 provides the volume of posts to the weblog ranker 210.

The example authority determiner 204 also receives the topic query 212, the monitoring data 214, and the list of weblogs 114 and 116, and determines a topic authority of one or more weblogs. The topic authority of the weblog 114 is the number of inlinks to the weblog 114 from other weblogs and/or web sites. To determine the topic authority of the weblog 114, the example authority determiner 204 determines the number of inlinks to the weblog by an index of inlinks with a list of posts that are relevant to the topic query 212. The authority determiner 204 then provides the topic authority of the one or more weblogs 114 to the weblog ranker 210.

The authority determiner 204 may alternatively determine the topic authority of the weblog 114 by determining a likelihood that a web user will load the weblog 114 in response to a search of the topic query 212 on the World Wide Web (e.g., Google search, Yahoo! search, etc.). For example, the authority determiner 204 may receive and/or determine an ordering in which web users navigate to the weblogs 114 and 116 based on search information received from the search monitoring system 130 of FIG. 1. Example search information may include an audience research panel (e.g., a Nielsen web panel such as a NetRatings panel), search provider statistics, user surveys, and/or another data collection method that provides information on user search habits. The authority determiner 204 may use the ordering as the topic authority of the weblog 114.

The example virality determiner 206 also receives the topic query 212, the monitoring data 214, and the list of weblogs 114 and 116, and determines a topic virality of one or more weblogs. The topic virality of the weblog 114 is a median time between postings of inlinks to the weblog 114. Thus, as inlinks to the weblog 114 are posted on other weblogs 116 and/or web sites 118 at a faster rate, the weblog 114 is considered more viral (e.g., the message of the weblog 114 self-replicates and spreads faster). The virality determiner 206 uses the median time between postings of inlinks instead of, for example, the mean time between postings of inlinks because the mean time may be more heavily influenced by outliers in the posting times. In contrast, the median time between postings of inlinks is more likely to accurately represent the viralities of different weblogs.

The example popularity determiner 208 determines a popularity of one or more weblogs 114 and 116. To determine the popularity of the weblog 114, the popularity determiner 208 determines a number of unique visitors to the weblog 114. The number of unique visitors may be determined over a particular time period or may be determined over the life of the weblog 114. In some examples, the popularity may be determined by the example popularity monitoring system 128 of FIG. 1, (e.g., Nielsen NetRatings), and downloaded by the popularity determiner 208.

The weblog ranker 210 receives the topic volume from the volume determiner 202, the topic authority from the authority determiner 204, the topic virality from the virality determiner 206, the popularity from the popularity determiner 208, and a list of weblogs from the weblog index 218. The weblog ranker 210 then scores and/or weights the ranking factors according to predetermined scores and/or weights. For example, the weblog ranker 210 may translate the topic virality from the virality determiner 206 from a median time to a score, where a lower median time results in a higher score. By translating the topic virality to a score, each of the ranking factors has a negative (or positive) relationship to a rank 216 of the weblog 114. Additionally or alternatively, any set or subset of the topic volume, the topic authority, and/or the popularity may be translated to a score. The translation(s) to score(s) may be based on an absolute or relative range, may have maximum and/or minimum score values, and/or may be weighted by relative importance. Thus, the ranking factors may be summed to determine an overall score, which then determines the rank 216 of the weblog 114 relative to other weblogs 116.

While the example weblog ranking system 108 of FIG. 2 is illustrated as receiving the topic query 212, the weblog monitoring data 214, and the popularity information from the popularity monitoring system 128 separately, the example weblog ranking system 108 may receive the topic query 212, the weblog monitoring data 214, the popularity information from the popularity monitoring system 128, and the search information from the search monitoring system 130 via one or more physical and/or virtual connections to an external network such as the Internet 112 of FIG. 1. Similarly, the weblog ranking system 108 may output the weblog rank(s) 216 via any one or more physical and/or virtual connections to a system user (e.g., a user of the user terminal 110 of FIG. 1). For example, the weblog ranking system 108 may receive the topic query 212 from the user terminal 110, the weblog monitoring data 214 from the monitoring system 102-106, the popularity information from the popularity monitoring system 128, and/or the search information from the search monitoring system 130 may be received via a single Ethernet connection using different ports. The weblog ranking(s) 216 may further be output via the Ethernet connection on one of the same ports or a different port as the input information.

Figure 3:
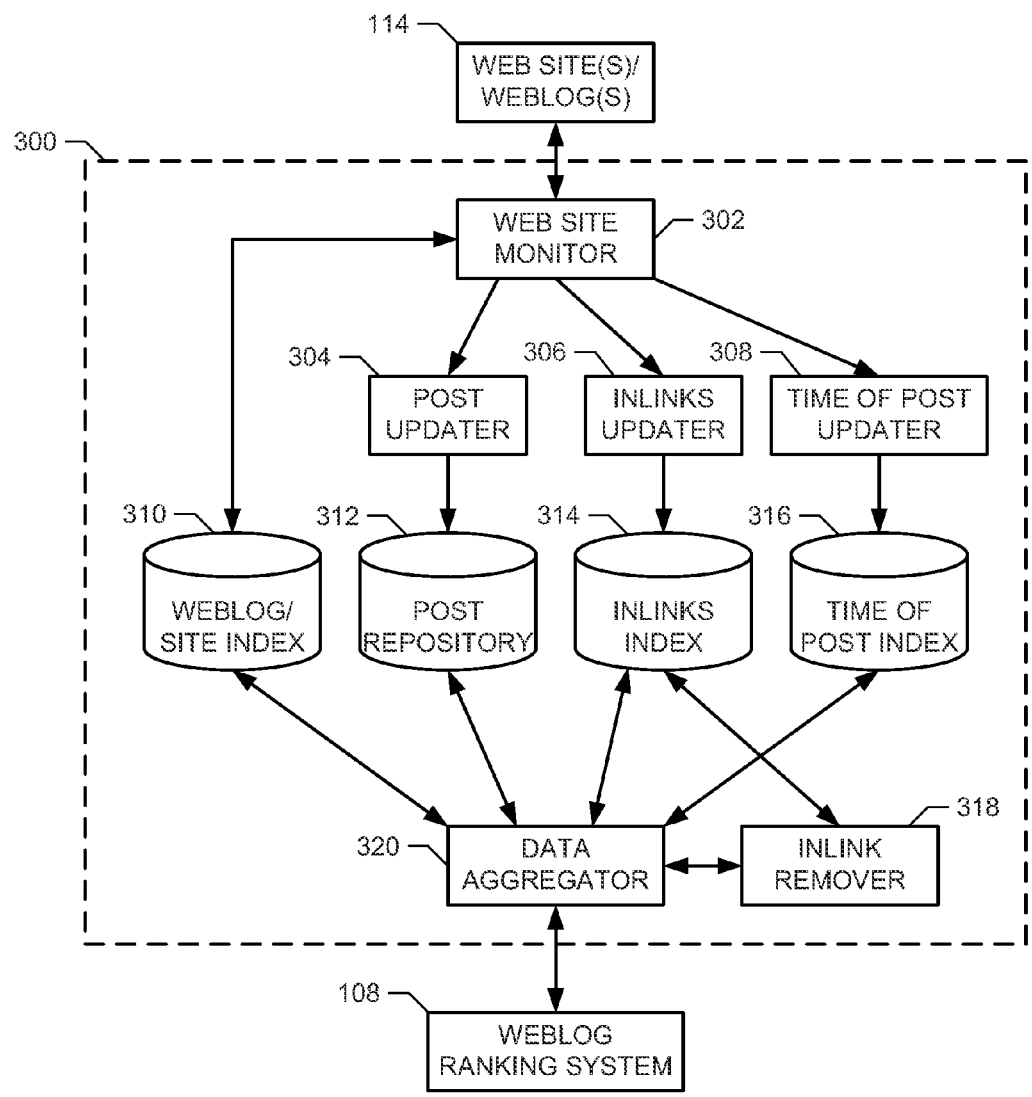
FIG. 3 is a more detailed block diagram of the example system of FIG. 1.

FIG. 3 is a block diagram illustrating an example monitoring system 300 to monitor weblogs and web sites for posts. The example monitoring system 300 may be used to implement any of the monitoring systems 102-106 of FIG. 1 to monitor weblogs, forums, and/or other web sites for posts. The monitoring system 300 of FIG. 3 includes a web site monitor 302, a post updater 304, an inlinks updater 306, and a time of post updater 308. The monitoring system 300 maintains several databases and/or indices, including a weblog/web site index 310, a post repository 312, an inlinks index 314, and a time of post index 316. Additionally, the monitoring system 300 includes an inlink remover 318 to remove inlinks from the inlinks index 314 as described below and a data aggregator 320 to aggregate data and to forward data to a weblog ranking system (e.g., the weblog ranking system 108 of FIG. 1).

The web site monitor 302 monitors one or more weblogs (e.g., the weblogs 114 and 116 of FIG. 1) and/or other web sites (e.g., the web sites 118 of FIG. 1). The weblogs 114 and 116 and/or web sites monitored by the web site monitor 302 may be determined by accessing the weblog/web site index 310. Each of the monitoring systems 102-106 has different weblogs and/or web sites included in its respective weblog/web site index 310, thereby causing each monitoring system 102-106 to monitor a different set of weblogs 114 and 116 and/or web sites 118. The weblogs 114 and 116 and/or web sites 118 may be distributed between the monitoring systems 102-106 in any appropriate manner to increase the performance of the weblog ranking system 108. The example weblog/web site index 310 therefore includes fields illustrated below in Table 2. While the example fields in Table 2 are similar to those in Table 1 (e.g., the weblog index 218), the example weblog/site index 310 may include forum(s) 118 and other web sites in addition to weblogs because the weblog/site index 310 is used to determine which weblogs 114 and 116 and/or web sites 118 are monitored by the example monitoring system 300.

TABLE 2

| WEBLOG/SITE ID | WEBLOG/SITE URL |
|---|---|
| ... | ... |
| [114] | www.weblog114.com |
| [116] | www.weblog116.com |
| [118] | www.forum118.com |
| ... | ... |

When the web site monitor 302 receives an indication of a weblog or web site (e.g., the weblog 114), the web site monitor 302 accesses a web server to download the most recent version of the weblog 114 to determine whether any updated content is available. The content of the downloaded weblog 114 is then processed by the post updater 304 to update the post repository 312. The post updater 304 extracts the content of any new posts to the weblog 114, such as keywords, and indexes the post contents in the post repository 312. Example alternative sets of fields used in the post repository 312 are illustrated below as Tables 3a and 3b. As illustrated in Table 3a, each post includes a unique POST ID by which a post may be identified and distinguished from other posts to the same weblog and/or other weblogs. In contrast, Table 3b is arranged by keyword, with the POST ID of each post that includes the keyword included in the POST ID field. However, using the arrangement of Table 3b requires an additional table to match each POST ID to a WEBLOG/SITE ID.

TABLE 3a

| POST ID | POST CONTENTS | WEBLOG/SITE ID |
|---|---|---|
| ... | ... | ... |
| [1140001] | keyword1, key2, keyword3 | [114] |
| [1140002] | key2, keyword4, key6 | [114] |
| [1140003] | key2, keyword4 | [114] |
| [1160001] | keyword7, key2, keyword4 | [116] |
| [1160002] | key2, keyword4, key8 | [116] |
| [1180001] | key2, keyword4, keyword9 | [118] |
| ... | ... | ... |

TABLE 3b

| KEYWORD | POST ID |
|---|---|
| ... | ... |
| keyword1 | [1140001] |
| key2 | [1140001], [1140002], [1140003], [1160001], [1160002], [1180001] |
| keyword4 | [1140002], [1140003], [1160001], [1160002], [1180001] |
| key6 | [1140002] |
| ... | ... |

The inlinks updater 306 also processes the content of the downloaded weblog 114 to determine whether any links to other weblogs are present. For example, a news weblog may cite and link to another weblog as a source of the information presented in a post on the news weblog. The inlinks are indexed by the inlinks updater 306 to update the inlinks index 314. An example inlinks index 314, as illustrated below in Table 4, may be a list of the posts to which each of the posts in the example post repository 312 links. While Table 4 is organized by LINKING POST ID (e.g., the post where a link to another post or weblog is posted), the example inlinks index 314 may alternatively be organized by LINKED POST ID, where the LINKING POST ID would then include the list of posts that link to the LINKED POST ID. The POST ID [1180001] below is illustrated in the example inlinks index 314 and is not illustrated in the example post repository 312 above because the post repository 312 includes the contents of those posts that are posted to weblogs 114 and 116 that may be ranked by the weblog ranking system 108 of FIG. 1.

TABLE 4

| LINKING POST ID | LINKED POST ID |
|---|---|
| ... | ... |
| [1140001] | null |
| [1140002] | [1160001] |
| [1140003] | [1160001] |
| [1160001] | [1140001] |
| [1160002] | [1140001] |
| [1180001] | [1140001], [1160001] |
| ... | ... |

Additionally, the time of post updater 308 determines the time(s) of any new post(s) to the weblog 114. The time of post updater 308 then stores the times of the posts in the time of post index 316. An example time of post index 316 is illustrated in Table 5. The example time of post index 316 is organized by POST ID, and includes a corresponding POST TIME at which the post was posted and/or observed by the web site monitor 302. The example POST TIME field is shown in a MM/DD/YYYY:hh:mm:ss 24-hour format. However, other formats and/or granularities of the time of posts may be used to reduce the size of the time of post index and/or to increase accuracy.

TABLE 5

| POST ID | POST TIME |
|---|---|
| ... | ... |
| [1140001] | 01/01/2010:08:00:00 |
| [1140002] | 01/02/2010:15:30:30 |
| [1140003] | 03/20/2010:21:56:59 |
| [1160001] | 01/02/2010:09:10:10 |
| [1160002] | 01/15/2010:20:20:00 |
| [1180001] | 02/28/2010:12:00:00 |
| ... | ... |

In the illustrated example, the indexed post contents in the post repository 312, the indexed inlinks in the inlinks index 314, and the indexed times of posts in the time of post index 316 include indicators of which post in which weblog 114 or 116 they originated, thereby correlating corresponding post contents, inlinks, and times for later processing.

When the weblog ranking system 108 ranks a weblog, the weblog ranking system 108 requests data from the example weblog monitoring system 300. Accordingly, the data aggregator 320 receives a request from the weblog ranking system 108 for weblog monitoring data that has been collected by the weblog monitoring system 300. In some examples, the weblog ranking system 108 includes in its request a topic query (e.g., the topic query 212 of FIG. 2).

The topic query 212 is received by the data aggregator 320 and is used to narrow the number of posts that are returned to the weblog ranking system 108. For example, the data aggregator 320 applies the topic query to the post repository 312. As a result, the data aggregator 320 determines a subset of the posts in the post repository 312. The subset is used to pull the inlinks and the times of the posts from the inlinks index 314 and the times of posts index 316, respectively, that correspond to the subset of posts based on the topic query. The data aggregator 320 may then transmit the posts, including the respective inlinks and the times of the posts, belonging to the subset corresponding to the topic query to the weblog ranking system 108. Additionally or alternatively, the data aggregator 320 may transmit indices of the posts (e.g., identifying information for the posts) to increase communications, processing, and/or storage efficienc(ies).

The inlink remover 318 may further filter the number of posts sent to the weblog ranking system 108 by the data aggregator 320 by removing or filtering inlinks from the inlinks index 314 that occur less than a predetermined number of times. By reducing the number of inlinks, the speed of data transfer may be increased to improve the responsiveness of a query. The removal of inlinks from the inlinks index 314 may temporarily mask the filtered inlinks from the data aggregator 320 for a particular topic query or may delete the filtered inlinks from the inlinks index 314 for later queries.

While example manners of implementing the example system 100 of FIG. 1 has been illustrated in FIGS. 2 and 3, one or more of the elements, processes and/or devices illustrated in FIGS. 2 and/or 3 may be combined, divided, re-arranged, omitted, eliminated and/or implemented in any other way. Further, the example volume determiner 202, the example virality determiner 206, the example authority determiner 204, the example popularity determiner 208, the example weblog ranker 210, the example web site monitor 302, the example post updater 304, the example inlinks updater 306, the example time of post updater 308, the example inlinks remover 318, the example data aggregator 320 and/or, more generally, the example weblog ranking system 108 of FIG. 2 and/or the example weblog monitoring system 300 of FIG. 3 may be implemented by hardware, software, firmware and/or any combination of hardware, software and/or firmware. Thus, for example, any of the example volume determiner 202, the example virality determiner 206, the example authority determiner 204, the example popularity determiner 208, the example weblog ranker 210, the example web site monitor 302, the example post updater 304, the example inlinks updater 306, the example time of post updater 308, the example inlinks remover 318, the example data aggregator 320 and/or, more generally, the example weblog ranking system 108 of FIG. 2 and/or the example weblog monitoring system 300 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc.

As used herein, the term tangible computer readable medium is expressly defined to include any type of computer readable storage and to exclude propagating signals. Additionally or alternatively, the example processes of FIGS. 4-10 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. When any of the appended apparatus claims are read to cover a purely software and/or firmware implementation, at least one of the example volume determiner 202, the example virality determiner 206, the example authority determiner 204, the example popularity determiner 208, the example weblog ranker 210, the example web site monitor 302, the example post updater 304, the example inlinks updater 306, the example time of post updater 308, the example inlinks remover 318, and/or the example data aggregator 320 are hereby expressly defined to include a tangible medium such as a memory, DVD, CD, etc. storing the software and/or firmware. Further still, the example volume determiner 202, the example virality determiner 206, the example authority determiner 204, the example popularity determiner 208, the example weblog ranker 210, the example web site monitor 302, the example post updater 304, the example inlinks updater 306, the example time of post updater 308, the example inlinks remover 318, the example data aggregator 320 and/or, more generally, the example weblog ranking system 108 of FIG. 2 and/or the example weblog monitoring system 300 of FIG. 3 may include one or more elements, processes and/or devices in addition to, or instead of, those illustrated in FIGS. 2 and 3, and/or may include more than one of any or all of the illustrated elements, processes and devices.

Figure 4:
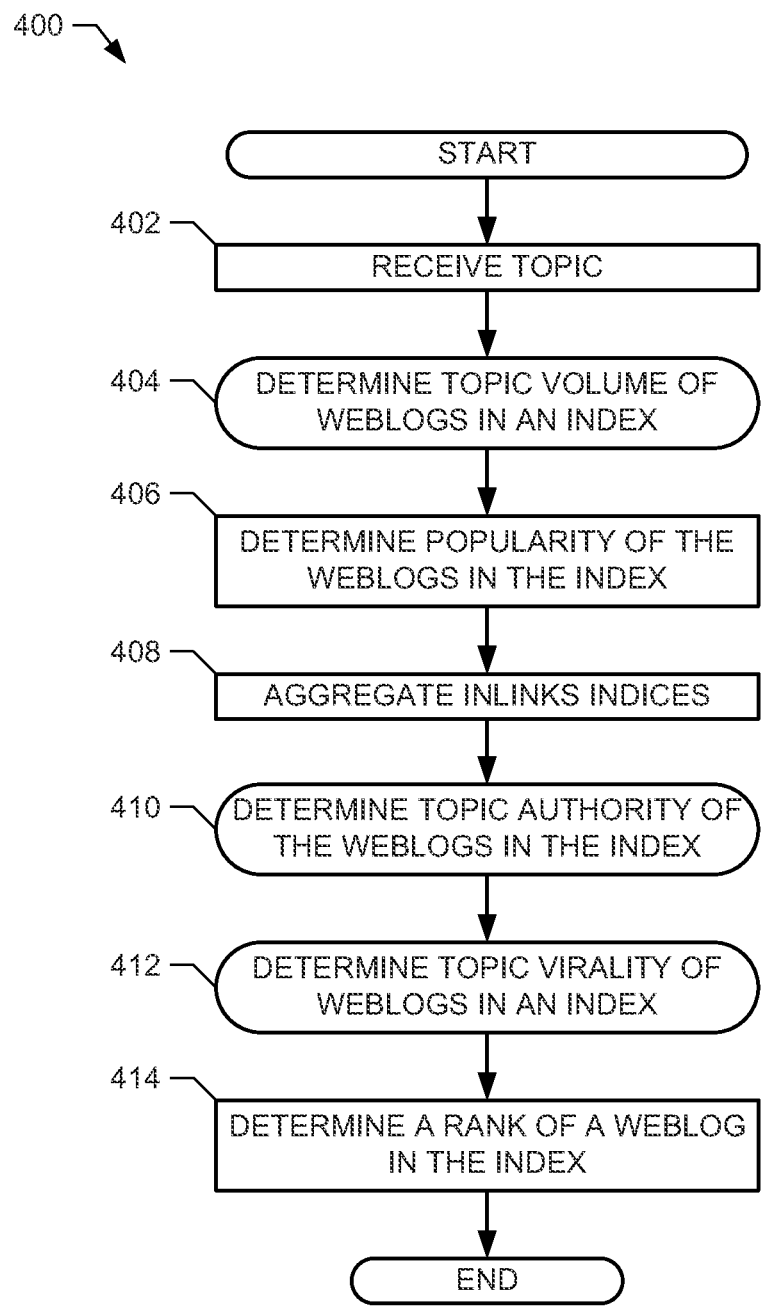
FIG. 4 is a flowchart representative of example machine readable instructions which may be executed to rank the influence of a weblog.

FIG. 4 is a flowchart representative of example machine readable instructions 400 which may be executed to rank the influence of a weblog (e.g., the example weblog 114 of FIG. 1). The instructions 400 may be executed by the weblog ranking system 108 of FIG. 3. The instructions 400 begin by receiving a topic from, for example, a user wishing to know the most influential weblogs related to the topic (block 402).

The weblog ranking system 108 determines a topic volume of weblogs in a weblog index (block 404). Block 404 is described in more detail below with reference to FIGS. 5 and 6. The weblog ranking system 108 further determines the popularity of weblogs in the weblog index 218 (block 406).

To prepare for determining the topic authority and topic virality, the weblog ranking system 108 aggregates the inlinks indices (block 408). For example, the weblog ranking system 108 may instruct the weblog monitoring systems 102-106 to aggregate and transmit posts relevant to the topic query 212 to the weblog ranking system 108. The posts may be further filtered by posting date and/or lower limit on inlinks for the weblog associated with a post. When the posts have been aggregated and transmitted to the weblog ranking system 108, the weblog ranking system 108 determines the topic authority of the weblogs in the weblog index (block 410). The topic authority may be based on the topic query 212 and the aggregated posts.

The weblog ranking system 108 (e.g., via the virality determiner 206) further determines the topic virality of the weblogs in the weblog index (block 412). The topic virality may be determined based on the topic authority of the weblogs because the topic authority is based on the inlinks to the weblogs and the topic virality is based on times between postings of the inlinks used to determine the topic authority.

When the weblog ranking system 108 has determined the topic volume (block 404), the popularity (block 406), the topic authority (block 410), and the topic virality (block 412) of the one or more weblogs, the weblog ranking system 108 (e.g., via the weblog ranker 210) determines the rank (e.g., the weblog rank 216 of FIG. 2) of one or more of the weblogs 114 (block 414). For example, the weblog ranker 210 weights the values of the topic volume, the popularity, the topic authority, and the topic virality and adds the weighted values to determine a score. In some examples, the topic virality is converted to a score, where a lower median time between postings of inlinks results in a higher score. When using a score for the topic virality, each of the topic volume, the popularity, the topic authority, and the topic virality score causes a better rank as the value of the factor increases. To rank a weblog (block 414), the weblog ranker 200 determines the total weighted values of at least two weblogs (e.g., the weblogs 114 and 116) and then compares the total weighted values of the weblogs 114 and 116 to determine the rank of each.

The weights used by the weblog ranker 210 may be modified to emphasize one or more of the topic volume, the popularity, the topic authority, and the topic virality. For example, popularity of a weblog may be emphasized (e.g., by increasing the weight relative to the other weights) when the topic query 212 is in an area that is heavily user- or popularity-driven. In another example, the topic virality may be emphasized when the user wishes to know the rankings of weblogs over a time period shortly following a particular event.

Figure 5:
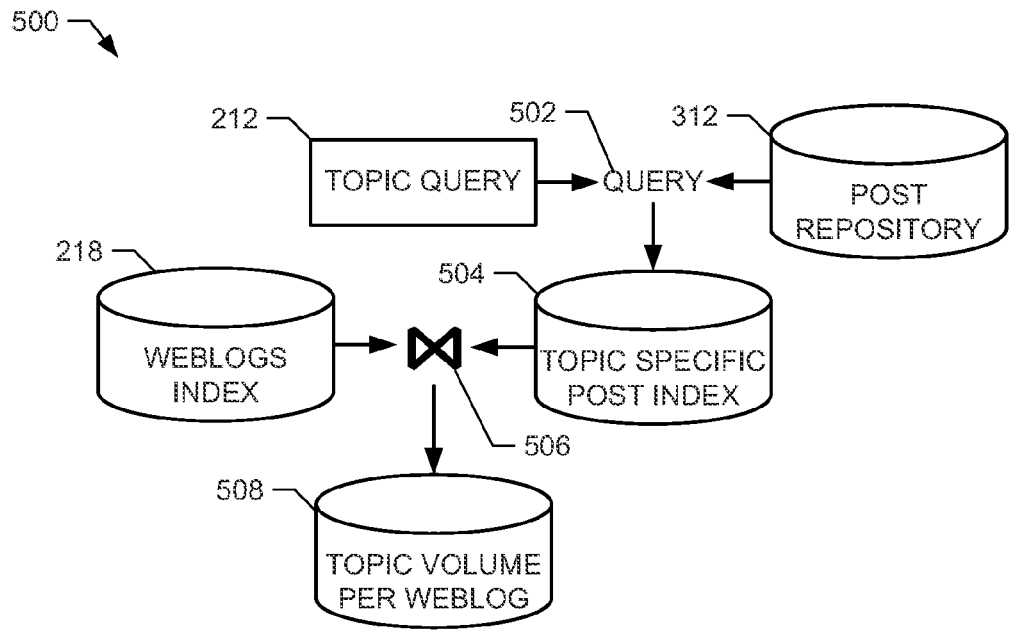
FIG. 5 is an example data flow that may be implemented by the example systems of FIGS. 2 and 3 to determine a topic volume of a weblog.
Figure 6:
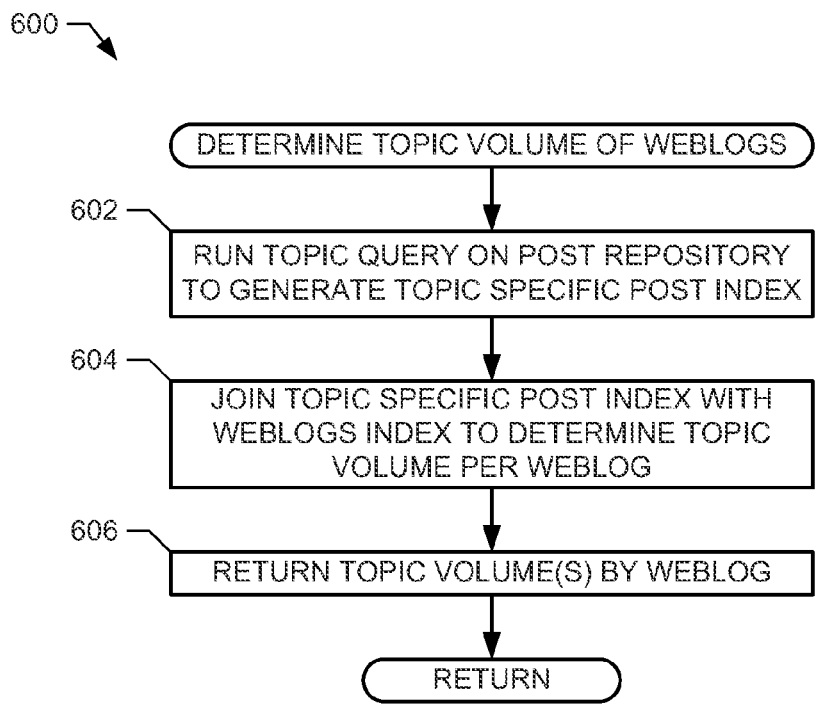
FIG. 6 is a flowchart representative of example machine readable instructions which may be executed to determine a topic volume of a weblog.

FIG. 5 is an example data flow 500 that may be implemented by the example systems of FIGS. 2 and 3 (e.g., via the volume determiner 202) to determine a topic volume of a weblog (e.g., the weblog 114 of FIG. 1). The example data flow 500 will be described with reference to the instructions 600 illustrated in FIG. 6. The flowchart illustrated in FIG. 6 is representative of example machine readable instructions 600 that may be executed to determine a topic volume of a weblog. The topic volume of the weblog, as described above, refers to a number of posts in the weblog that contain or are directed to a particular topic.

The example instructions 600 may begin by running 502 (e.g., applying) a topic query (e.g., the topic query 212 of FIG. 2) to a post repository (e.g., the example post repository 312 of FIG. 3) to generate a topic specific post index 504 (e.g., filter the records in the post repository 312) (block 602). The topic specific post index 504 includes the list of posts from the post repository 312 that are related to the topic query 212. An example topic specific post index 504, resulting from the application 502 of the topic query 212 to the post repository 312, includes data fields similar or identical to those of the post repository 312 as illustrated in Tables 3a and/or 3b above.

The example query operation 502 of FIG. 5 identifies entries in the post repository 312 that include the terms in the topic query 212. The query operation 502 may identify only those entries that include all of the terms in the topic query 212 or may identify any entries that include at least one of the terms in the topic query 212. However, the query operation 502 may be used to identify entries in the post repository 312 that have a minimum relevance score (e.g., meet a lower threshold of terms in the topic query 212).

The example compare operations 506, 706, 710, 714, and 718 described below are illustrated as natural join operations (⋈) in FIGS. 5 and 7, but other comparison operations may be used. As used herein, the term "join" generally refers to the natural join mathematical operation between two sets (e.g., indices, tables, etc.) that results in another set that includes the combinations of tuples in the two sets that are equal or substantially equal on their common attributes. In some examples, other types of join operations may be used to achieve a desired result set. Additionally, joins may be performed on fields that do not have identical field names (e.g., joining Table_3a.[POST ID] on Table_4.[LINKING POST ID]). Additionally or alternatively, any type of appropriate set operation(s), logic operation(s), and/or other data operation(s) may be used to perform the comparisons 506, 706, 710, 714, and 718.

The example volume determiner 202 compares 506 the topic specific post index 504 to a weblog index (e.g., the weblog index 218 of FIG. 2) to determine a topic volume per weblog 508 (block 604). The weblog index 218 is a list of the weblog to which each post in the post repository belongs. Thus, the compare 506 at block 604 generates a list of the number of posts for each weblog in the weblog index 218, which is used as the topic volume per weblog. The volume determiner 202 returns the topic volume per weblog 508 to the weblog ranker 210. An example topic volume per weblog 508 is illustrated below in Table 6, where the topic query 212 includes the keywords "key2,keyword4," and the keywords are combined in an AND operation. Of course, the topic query 212 may support any type of Boolean query including, but not limited to, the AND, OR, and/or NOT Boolean operators.

TABLE 6

| WEBLOG ID | POST ID |
|---|---|
| ... | ... |
| [114] | [1140002], [1140003] |
| [116] | [1160001], [1160002] |
| ... | ... |

Figure 7:
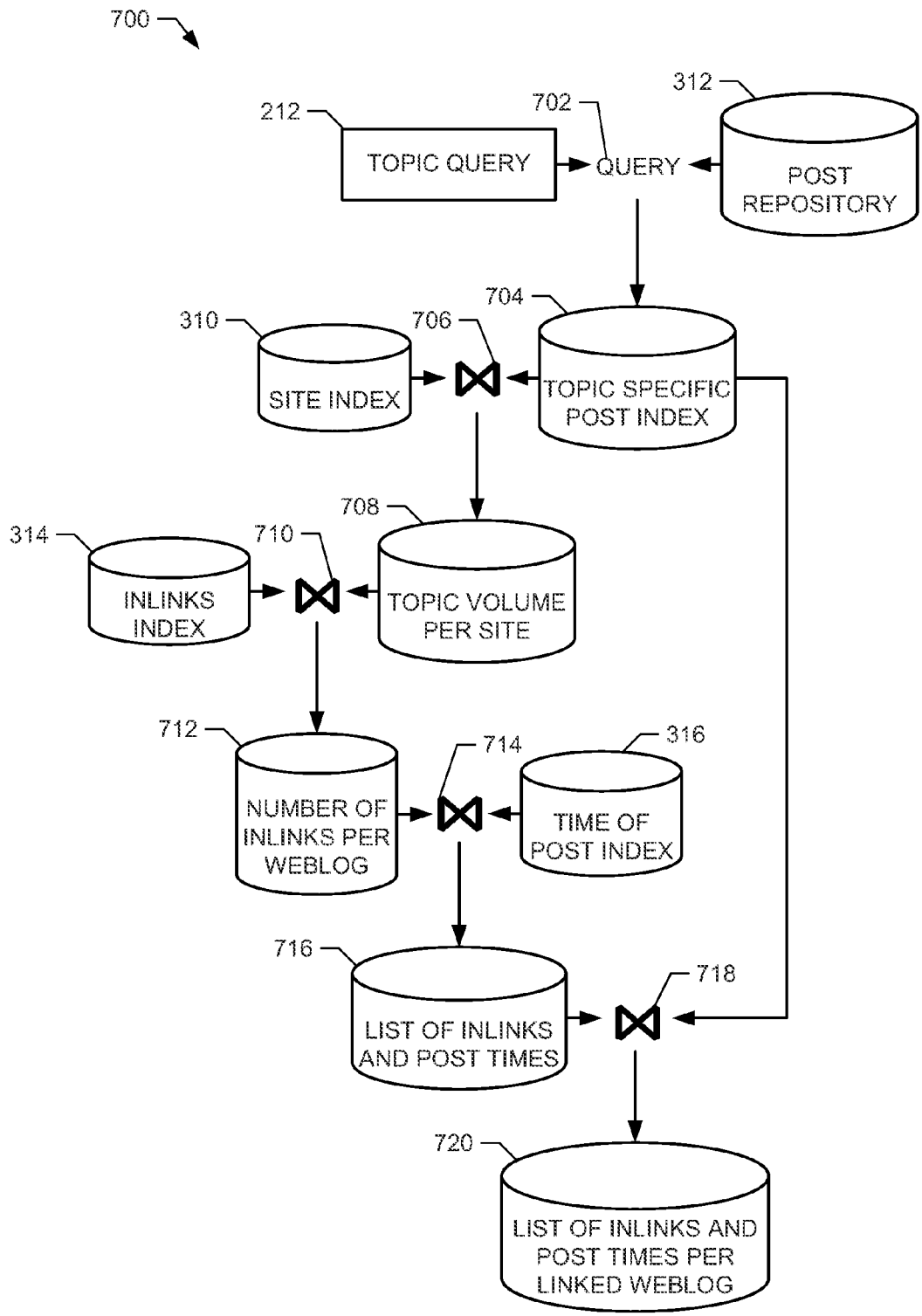
FIG. 7 is an example data flow that may be implemented by the example systems of FIGS. 2 and 3 to determine a topic authority and/or a topic virality of a weblog.
Figure 8:
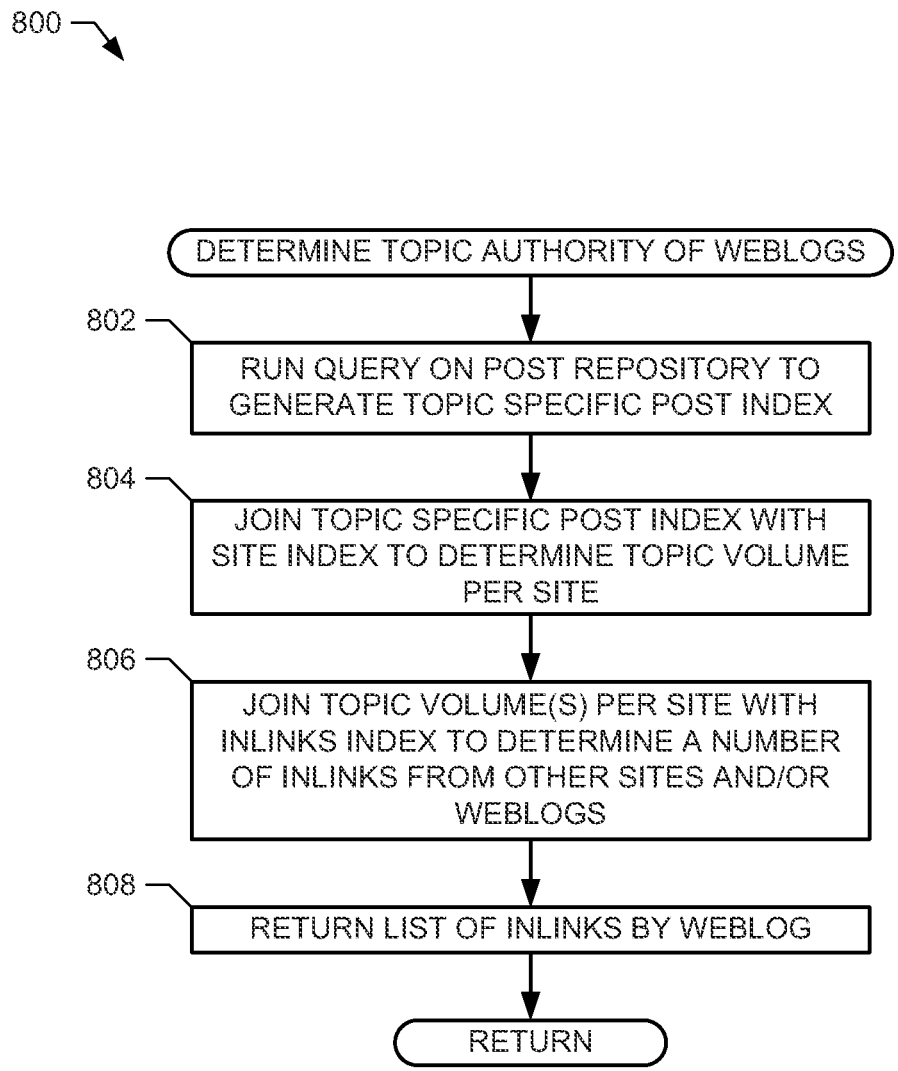
FIG. 8 is a flowchart representative of example machine readable instructions which may be executed to determine a topic authority of a weblog.
Figure 9:
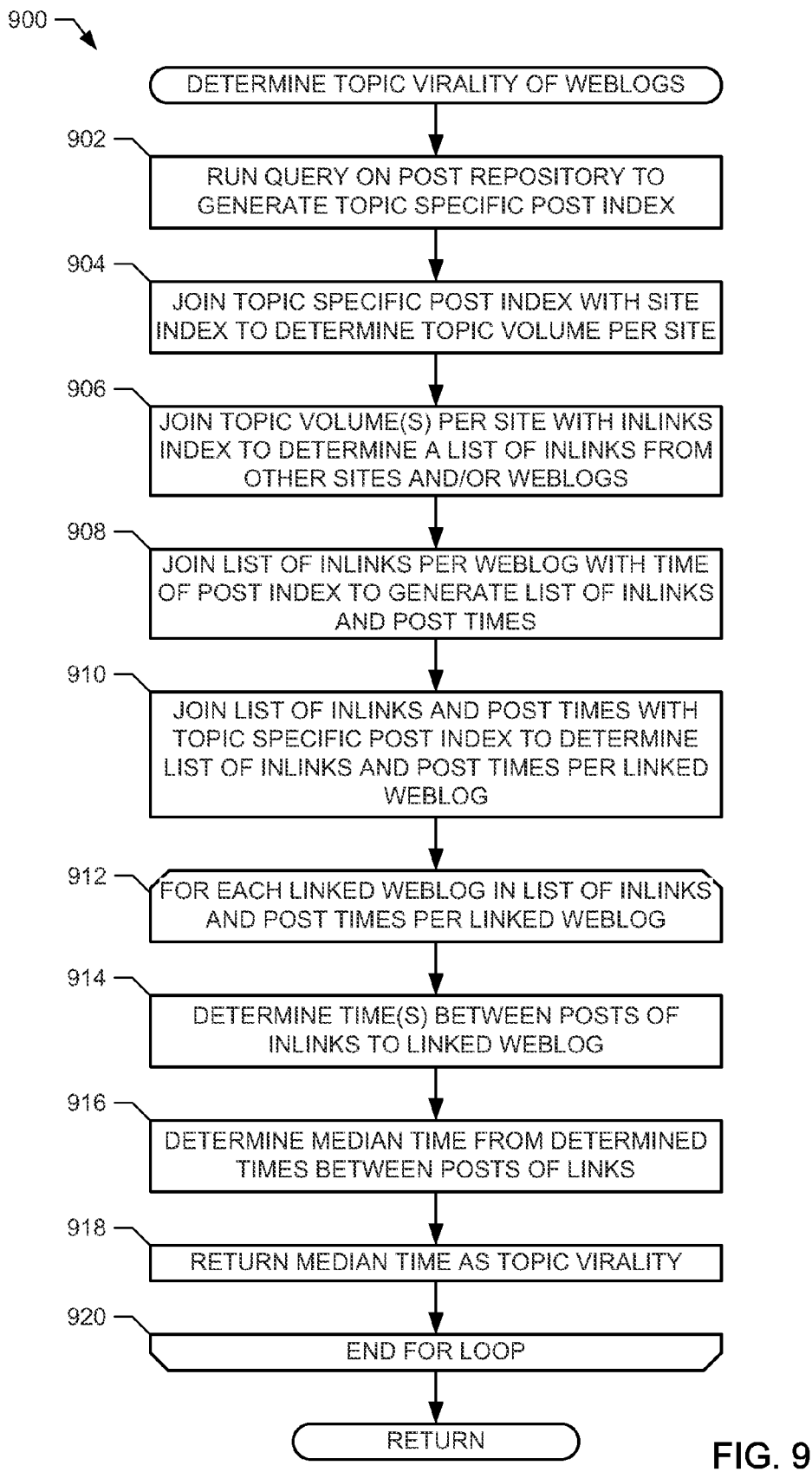
FIG. 9 is a flowchart representative of example machine readable instructions which may be executed to determine a topic virality of a weblog.

FIG. 7 is an example data flow 700 that may be implemented by the example systems of FIGS. 2 and 3 to determine a topic authority and/or a topic virality of a weblog (e.g., the weblog 114 of FIG. 1). The example data flow 700 will be described with reference to example machine readable instructions 800 and 900 of FIGS. 8 and 9. FIG. 8 is a flowchart representative of example machine readable instructions 800 which may be executed to determine a topic authority of the weblog 114. The authority determiner 204 of FIG. 2 may be used to implement the example instructions 800. FIG. 9 is a flowchart representative of example machine readable instructions 900 which may be executed to determine a topic virality of the weblog 114. The virality determiner 206 of FIG. 2 may be used to implement the example instructions 900.

The example instructions 800 begin by running (e.g., via the volume determiner 202 or the authority determiner 204 of FIG. 2) the topic query 212 on the post repository 312 (e.g., a query 702) to generate a topic specific post index 704 (block 802). As described above, the topic specific post index 704 is a list of the posts in the post repository 312 that belong to the monitored weblogs and may have fields similar or identical to those of the example post repository 312 illustrated in Table 3a or 3b. Block 802 is similar to block 602 of FIG. 6. The authority determiner 204 then compares 706 the topic specific post index 704 to the web site index 310 to generate a topic volume per site 708 (block 804). In contrast to the weblog index 218 used, the web site index 310 includes other sites (e.g., the web site 118 of FIG. 1) in addition to weblogs (e.g., the weblogs 114 and 116 of FIG. 1). The example topic volume per site 708 may include fields similar or identical to those illustrated in Table 6 above.

The authority determiner 204 compares 710 the topic volume per site 708 to the inlinks index 314 to generate a list of inlinks per weblog 712 (block 806). As described above, the inlinks index 314 is a list of inlinks to weblogs and an indicator of the post and/or web site to which each inlink belongs. The comparison 710 of the inlinks index 314 to the topic volume per site 708 (e.g., the posts relevant to the topic query 212) results in the number of inlinks per weblog that are relevant to the topic query 212. Thus, inlinks to a weblog that are not relevant to the topic query 212 are excluded. An example list of inlinks per weblog is illustrated below in Table 7. The authority determiner 204 then outputs or returns the list of inlinks per weblog 712 to the weblog ranker 210 as the topic authority (block 808). Control may then return to block 412 of FIG. 4 to determine topic virality (e.g., the instructions 900 of FIG. 9).

TABLE 7

| WEBLOG ID | LINKING POST ID |
|---|---|
| ... | ... |
| [114] | [1160001], [1160002], [1180001] |
| [116] | [1140002], [1140003], [1180001] |
| ... | ... |

Blocks 902, 904, and 906 of FIG. 9 are substantially identical to respective blocks 802, 804, and 806 of FIG. 8. Accordingly, if the instructions 800 are executed prior to the execution of the instructions 900 (e.g., block 410 of FIG. 4 is executed prior to block 412), execution of blocks 902, 904, and 906 may be omitted for processing efficiency. For example, after the authority determiner 204 determines the list of inlinks per weblog 712, the authority determiner 204 may pass the list of inlinks per weblog 712 to the virality determiner 206 in addition to the weblog ranker 210. At block 908, the virality determiner 206 compares 714 the list of inlinks per weblog 712 to the time of post index 316 to generate a list of inlinks and corresponding post times 716. Thus, the list of inlinks and post times 716 includes the times at which topic specific inlinks were posted on a weblog or other web site. An example list of inlinks and post times 716 is illustrated below in Table 8.

TABLE 8

| LINKING POST ID | LINKED POST ID | POST TIME |
|---|---|---|
| ... | ... | ... |
| [1140002] | [1160001] | 01/02/2010:15:30:30 |
| [1140003] | [1160001] | 03/20/2010:21:56:59 |
| [1160001] | [1140001] | 01/02/2010:09:10:10 |
| [1160002] | [1140001] | 01/15/2010:20:20:00 |
| [1180001] | [1140001], [1160001] | 02/28/2010:12:00:00 |
| ... | ... | ... |

The virality determiner 206 then compares 718 the list of inlinks and post times 716 to the topic specific post index 704 to generate a list of inlinks and post times per linked weblog 720. The example comparison 718 causes inlinks to topic-specific weblogs 114 and 116 to be discarded if the inlinks are not posted in topic specific posts. Thus, the example method 900 ranks topic-specific influence of a weblog 114 or 116 based on virality within other topic-specific weblogs 114 and 116 and/or web sites 118. An example list of inlinks and post times per linked weblog 720 is illustrated below in Table 9. As shown in Table 9, the example POST IDs may be arranged chronologically according to the corresponding POST TIME value.

TABLE 9

| WEBLOG ID | LINKING POST ID | POST TIME |
|---|---|---|
| ... | ... | ... |
| [114] | [1160001], [1160002], [1180001] | 01/02/2010:09:10:10, 01/15/2010:20:20:00, 02/28/2010:12:00:00 |
| [116] | [1140002], [1180001], [1140003] | 01/02/2010:15:30:30, 02/28/2010:12:00:00, 03/20/2010:21:56:59 |
| ... | ... | ... |

Using the list of inlinks and post times per linked weblog 720, the virality determiner 206 determines the virality of each linked weblog. The virality determiner 206 begins a loop by selecting a linked weblog in the list of inlinks and post times per linked weblog 720 (block 912). For the selected linked weblog, the virality determiner 206 determines the time(s) between posts of inlinks to the linked weblog (e.g., based on the inlinks and post times in the inlinks and post times per linked weblog 720) (block 914). From the determined time(s), the virality determiner 206 determines the median time (block 916). The virality determiner 206 then returns the median time as the topic virality of the selected linked weblog (block 918). In the described example, a weblog has a higher topic virality as the median time between posts decreases. The virality uses the median time to reduce or eliminate the effect of outlier times between posts. The virality determiner 206 then either iterates the loop at block 920 or, if the topic virality has been determined for the linked weblogs in the inlinks and post times per linked weblog 720, the loop may end at block 920. Control may then return to block 414 of the instructions 400 of FIG. 4.

Figure 10:
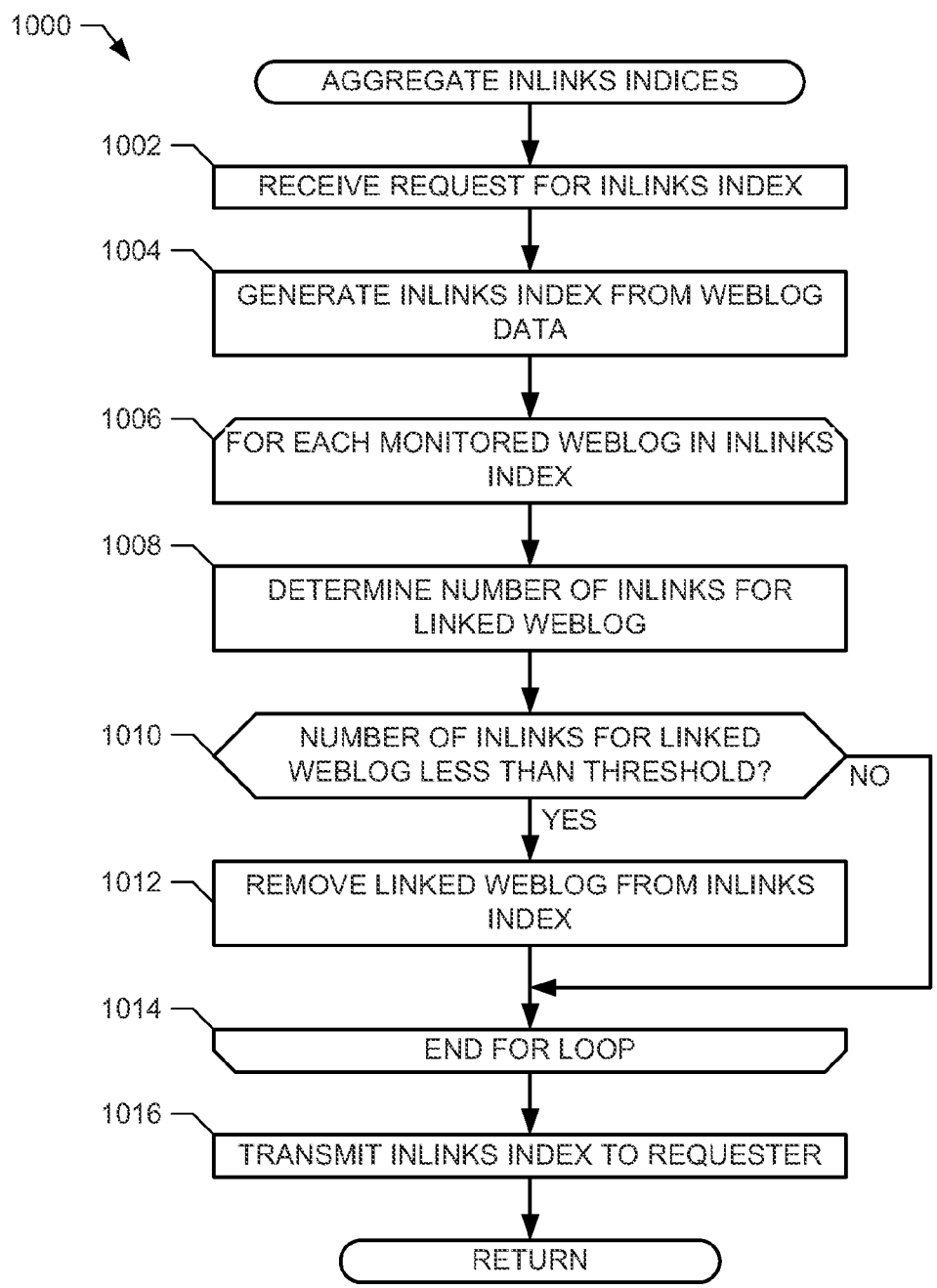
FIG. 10 is a flowchart representative of example machine readable instructions which may be executed to aggregate an inlinks index.

FIG. 10 is a flowchart representative of example machine readable instructions 1000 that may be executed to aggregate an inlinks index (e.g., the inlinks index 314 of FIG. 3). The instructions 1000 may be executed by, for example, the weblog monitoring system 300 of FIG. 3 in response to a request for a list of inlinks from the weblog ranking system 108 of FIG. 1. By executing the instructions 1000, the processing time for ranking a weblog based on a topic may be significantly reduced.

The weblog monitoring system 300 receives a request for a list of inlinks (e.g., from the weblog ranking system 108 of FIG. 1) (block 1002). The weblog monitoring system 300 (e.g., via the web site monitor 302 and the inlinks updater 306) generates an inlinks index (e.g., the inlinks index 314 of FIG. 3) (block 1004). In some examples, the inlinks index 314 may be generated and/or updated prior to receiving the request for the list of inlinks to further reduce processing time. As described above, the inlinks index 314 includes an indicator of the weblog to which each inlink links.

Block 1006 begins a loop to process the weblogs in the inlinks index 314 by selecting a linked weblog from the inlinks index 314. The weblog monitoring system 300 (e.g., via the inlinks remover 318) determines the number of inlinks for the linked weblog (block 1008). The inlinks remover 318 determines whether the number of inlinks is less than a lower threshold (block 1010). If the number of inlinks is less than the threshold (block 1010), the inlinks remover 318 removes the linked weblog and/or the inlinks to the linked weblog from the inlinks index 314 (block 1012). After removing the linked weblog and/or the inlinks (block 1012), or if the number of inlinks is greater than or equal to the threshold (block 1010), the inlinks remover 318 iterates or ends the loop (block 1014). If there are additional linked weblogs to be evaluated, the loop iterates at block 1006. When the loop has ended (block 1014), the weblog monitoring system 300 transmits the inlinks index 314 (as modified by the inlinks remover 318) to the requesting system, such as the weblog ranking system 108.

Figure 11:
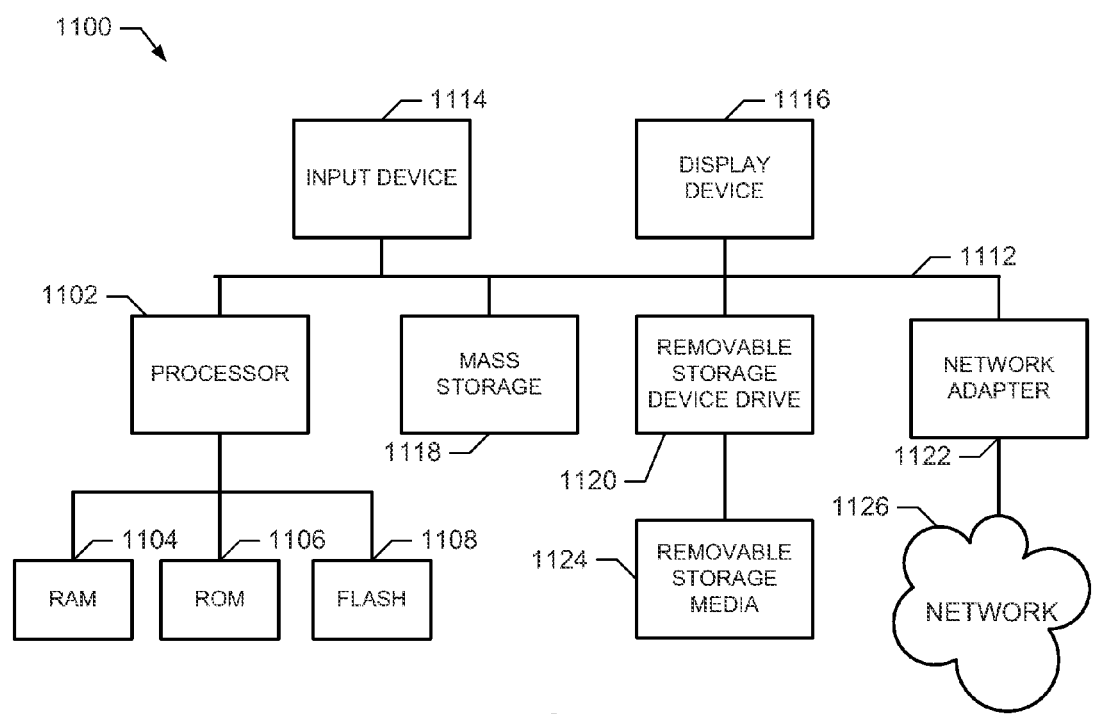
FIG. 11 is a diagram of an example processor system that may be used to execute the example machine readable instructions.

FIG. 11 is a diagram of an example processor system 1100 that may be used to execute the example machine readable instructions 400, 600, 800, 900, and 1000 described in FIGS. 4, 6, 8, 9, and 10, as well as to implement the weblog ranking system 108 and/or the weblog monitoring system 300 described in FIGS. 2 and 3. The example processor system 1100 includes a processor 1102 having associated memories, such as a random access memory (RAM) 1104, a read only memory (ROM) 1106 and a flash memory 1108. The processor 1102 is coupled to an interface, such as a bus 1112 to which other components may be interfaced. In the illustrated example, the components interfaced to the bus 1112 include an input device 1114, a display device 1116, a mass storage device 1118, a removable storage device drive 1120, and a network adapter 1122. The removable storage device drive 1120 may include associated removable storage media 1124 such as magnetic or optical media. The network adapter 1122 may connect the processor system 1100 to an external network 1126.

The example processor system 1100 may be, for example, a conventional desktop personal computer, a notebook computer, a workstation or any other computing device. The processor 1102 may be any type of processing unit, such as a microprocessor from the Intel® Pentium® family of microprocessors, the Intel® Itanium® family of microprocessors, and/or the Intel XScale® family of processors. The memories 1104, 1106 and 1108 that are coupled to the processor 1102 may be any suitable memory devices and may be sized to fit the storage demands of the system 1100. In particular, the flash memory 1108 may be a non-volatile memory that is accessed and erased on a block-by-block basis.

The input device 1114 may be implemented using a keyboard, a mouse, a touch screen, a track pad, a barcode scanner or any other device that enables a user to provide information to the processor 1102.

The display device 1116 may be, for example, a liquid crystal display (LCD) monitor, a cathode ray tube (CRT) monitor or any other suitable device that acts as an interface between the processor 1102 and a user. The display device 1116 as pictured in FIG. 8 includes any additional hardware required to interface a display screen to the processor 1102.

The mass storage device 1118 may be, for example, a conventional hard drive or any other magnetic, optical, or solid state media that is readable by the processor 1102.

The removable storage device drive 1120 may, for example, be an optical drive, such as a compact disk-recordable (CD-R) drive, a compact disk-rewritable (CD-RW) drive, a digital versatile disk (DVD) drive or any other optical drive. It may alternatively be, for example, a magnetic media drive and/or a solid state universal serial bus (USB) storage drive. The removable storage media 1124 is complimentary to the removable storage device drive 1120, inasmuch as the media 1124 is selected to operate with the drive 1120. For example, if the removable storage device drive 1120 is an optical drive, the removable storage media 1124 may be a CD-R disk, a CD-RW disk, a DVD disk or any other suitable optical disk. On the other hand, if the removable storage device drive 1120 is a magnetic media device, the removable storage media 1124 may be, for example, a diskette or any other suitable magnetic storage media.

The network adapter 1122 may be, for example, an Ethernet adapter, a wireless local area network (LAN) adapter, a telephony modem, or any other device that allows the processor system 1100 to communicate with other processor systems over a network. The external network 1126 may be a LAN, a wide area network (WAN), a wireless network, or any type of network capable of communicating with the processor system 1100. Example networks may include the Internet, an intranet, and/or an ad hoc network.

Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computer-implemented method to rank the influence of a web site, comprising:
    filtering out a post that is not relevant to a topic term from a first plurality of posts to a web site;
    determining a number of inbound links to the web site based on the topic term;
    determining a time between the inbound links to the web site based on the topic term;
    determining a number of posts that are relevant to the topic term by:
        generating a query based on the topic term;
        generating a first index by applying the query to the first plurality of posts to the web site; and
        determining the number of posts by comparing the first index with a second index, wherein the second index comprises a list of web sites to which a second plurality of posts belong, the second plurality of posts includes the first plurality of posts; and
    generating a rank of the web site based on the number of inbound links, the number of posts, and the time between the inbound links.

2. A computer-implemented method to rank the influence of a web site, comprising:
    filtering out a post that is not relevant to a topic term from a first plurality of posts to a web site;
    determining a number of inbound links to the web site based on the topic term by:
        generating a query based on the topic term;
        generating a first index by applying the query to the first plurality of posts to the web site;
        comparing the first index to a second index to generate a third index,
    wherein the second index comprises a list of web sites to which a second plurality of posts belongs, wherein the second plurality of posts includes the first plurality of posts;
        generating a fourth index comprising a list of posts to which the first plurality of posts link; and
        determining the number of inbound links by comparing the third and fourth indices;
    determining a time between the inbound links to the web site based on the topic term; and
    generating a rank of the web site based on the number of inbound links and the time between the inbound links.

3. A tangible storage medium comprising machine readable instructions which, when executed, cause a machine to at least:
    filter out a post that is not relevant to a given topic term from a first plurality of posts to a web site;
    determine a number of inbound links to the web site based on the topic term;
    determine a time between the inbound links to the web site based on the topic term;
    determine a number of the posts by:
        generating a query based on the topic term;
        generating a first index by applying the query to the first plurality of posts to the web site; and
        determining the number of the posts by comparing the first index to a second index, wherein the second index comprises a list of web sites to which a second plurality of posts belong, wherein the second plurality of posts includes the first plurality of posts; and generate a rank of the web site based on the number of inbound links and the time between the inbound links.

4. A tangible storage medium comprising machine readable instructions which, when executed, cause a machine to at least:
- filter out a post that is not relevant to a given topic term from a first plurality of posts to a web site;
- determine a number of posts that are relevant to the topic term by at least:
  - generating a query based on the topic term;
  - generating a first index by applying the query to the first plurality of posts to the web site; and
  - determining the number of posts by comparing the first index to a second index, wherein the second index comprises a list of web sites to which a second plurality of posts belong, wherein the second plurality of posts includes the first plurality of posts;
- determine a number of inbound links to the web site based on the topic term;
- determine a time between the inbound links to the web site based on the topic term; and
- generate a rank of the web site based on the number of inbound links, the number of posts, and the time between the inbound links.

5. A tangible storage medium comprising machine readable instructions which, when executed, cause a machine to at least:
- receive at least a portion of an index from a web site monitor;
- filter out a post that is not relevant to a given topic term from a first plurality of posts to a web site;
- determine a number of inbound links to the web site based on the topic term;
- determine a time between the inbound links to the web site based on the topic term; and
- generate a rank of the web site based on the number of inbound links and the time between the inbound links.

6. A method as defined in claim 1, further comprising determining a number of unique visitors to the web site, wherein the rank is based on the number of unique visitors.

7. A method as defined in claim 2, wherein determining a time between inbound links comprises:
- generating a fifth index comprising posting times of the second plurality of posts;
- comparing the fifth index to the number of inbound links to generate a sixth index comprising inbound links and posting times; and
- comparing the sixth index to the first index to generate a seventh index comprising inbound links, posting times, and posts associated with the inbound links and the posting times.

8. A method as defined in claim 2, further comprising receiving at least a portion of the fourth index from a web site monitor.

9. A storage medium as defined in claim 3, wherein the time between the inbound links comprises a median time between the inbound links.

10. A storage medium as defined in claim 5, wherein the received portion of the index comprises posts having a number of inbound links that is greater than a threshold.

11. A method as defined in claim 7, wherein the time between the inbound links comprises a median time between the inbound links.

12. A method as defined in claim 7, wherein the comparing comprises a join operation.

13. A method as defined in claim 8, wherein the received portion of the fourth index comprises posts having a number of inbound links that is greater than a predetermined threshold.

* * * * *